April 19, 1960 A. MICALE 2,933,058
PINKING ATTACHMENT FOR SEWING MACHINES
Filed April 16, 1958
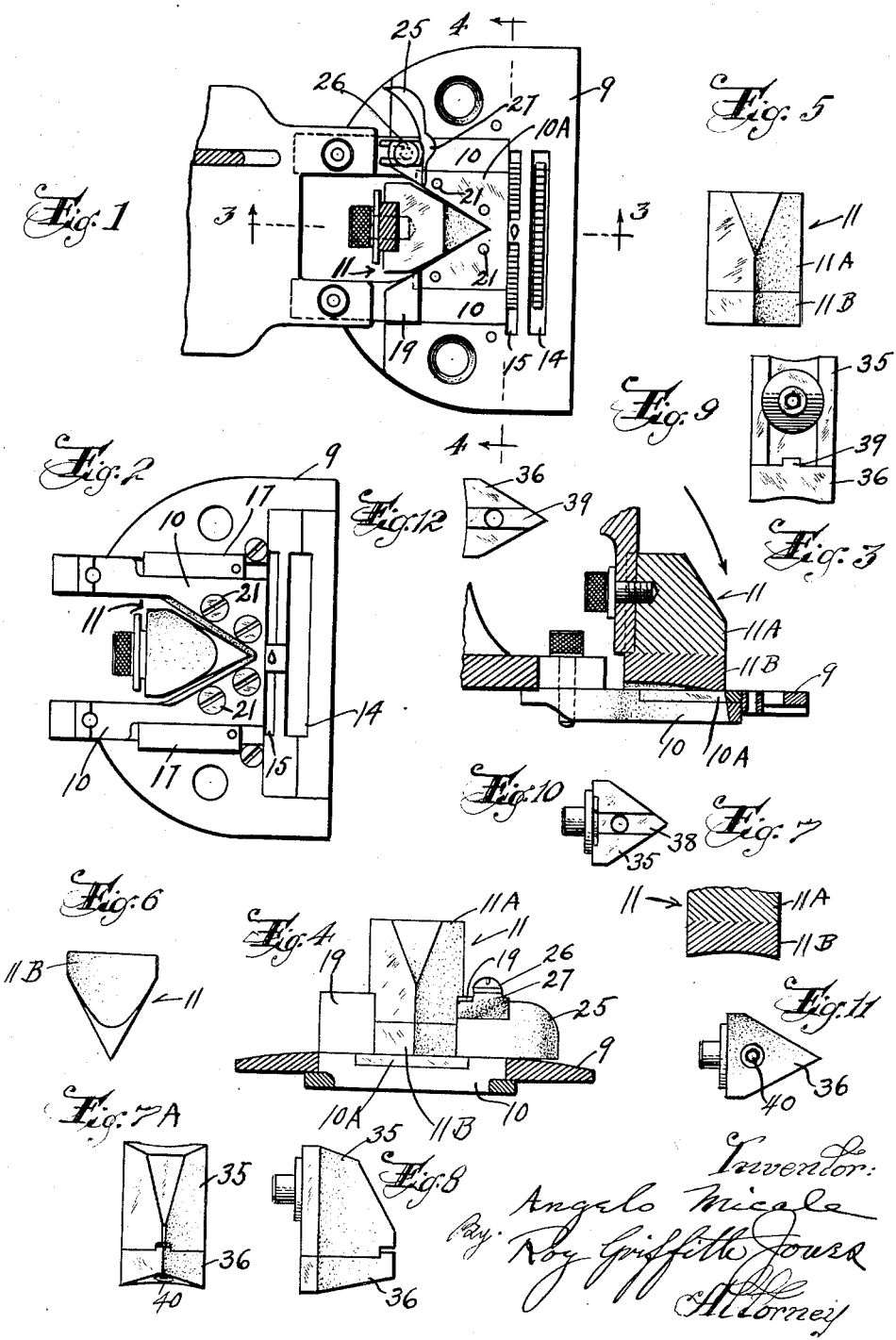

United States Patent Office 2,933,058
Patented Apr. 19, 1960

2,933,058
PINKING ATTACHMENT FOR SEWING MACHINES
Angelo Micale, New Brunswick, N.J.
Application April 16, 1958, Serial No. 728,974
1 Claim. (Cl. 112—122)

This invention relates to pinking attachments for sewing machines.

An object of the invention is to greatly reduce the maintenance, repair, and replacement, expenses of present pinking attachments used on industrial sewing machines, which, as known, are run at high speed for long periods and often on heavy materials.

Present pinking attachments of industrial sewing machines are defective in several respects, requiring frequent replacements due to breakage and wear, and consequent frequent adjustments of new and resharpened parts. Said frequent adjustments must be accurate and are time-consuming, and therefore costly, as expert mechanics are required for this work. Additionally, the loss of machine working-time must be added to the other expenses. And when it is considered that the foregoing applies to an enormous number of sewing machine in the needle trades, the savings to be effected by the present invention are very large, such savings having been proven by use of the invention under regular manufacturing conditions.

With previous pinking attachments, the reciprocating knife quickly becomes dull and therefore requires frequent sharpening, which involves loss of production time while the knife is taken out and a new one put in to replace it. Also, for resharpening, the knife must be sent to the manufacturer.

The frequent resharpening soon wears the knife to such an extent that it becomes so short as to be unusable, and has to be discarded. Furthermore, the knives generally used break under heavy duty. The knives cost about five dollars each.

As heretofore made, the shearing plate, part of which constitutes the lower knife, presents the same troubles as the knife or upper blade, plus additional ones. As known, the apex of the V-cut of the shearing plate is necessarily close to the edge of the plate, leaving an inherently weak spot which often breaks. This necessitates discarding the whole shearing plate, which is expensive, as this plate involves a mechanism much more than the cutting edge. Shearing plates cost about five dollars each. As the cutting edge of the shearing plate often becomes dull, it has to be ground down about one thirty-second of an inch each time it is resharpened, making it thinner each time by the stated amount and to that extent weaker at the stated inherently weak spot, viz., at the apex of V-cut. But this is not the only trouble; the thinning of the shearing plate by frequent resharpening causes its upper surface to fall below the surface of the throw-plate, in which it is necessarily held; this condition with the cloth passing over the throw plate, for sewing at one level, and over the shearing plate at a lower level for pinking, produces poor work, throwing the feeding out of order due to parts of the cloth moving at different rates. To temporarily remedy this situation, shims have to be put under the shearing plate, that is, between it and the throw-plate, to lift the former to the level of the latter.

According to my invention, the upper or reciprocating knife is improved so that it does not break, automatically sharpens the shearing plate as it operates, and requires only very infrequent sharpening, with the several consequent advantages stated above. I have also improved the shearing plate in several respects. For one thing, I make shorter the uprights of the shearing plate which limit the downward movement of the reciprocating or upper knife, and thus make available a greater percentage of the knife as it becomes shorter due to sharpening. I also provide, as part of the shearing plate, an improved cloth or materials guide, which is not attached to the machine as present cloth guides are. Further, instead of having to throw away the shearing plate when it breaks, I divide it into two parts, one of which is permanent and the other and lesser part, involving the cutting edge, is replaceable. And I further strengthen the permanent part, thus reducing the mentioned breakage. The total result is a large reduction in expense and improved operation of the machines.

The defects of the prior art, as related above, have long existed, machine owners and expert technicians working on the machines not having previously realized how those defects could be eliminated, thus evidencing invention in the present improvements.

The drawings illustrate the invention, and in these:

Fig. 1 is a plan view of the combined throw plate, shearing plate and knife, looking forward from the rear;

Fig. 2 is a bottom plan view of Fig. 1;

Fig. 3 is a section on line 3—3 of Fig. 1;

Fig. 4 is a view taken on line 4—4 of Fig. 1;

Fig. 5 is a front elevation of the knife;

Fig. 6 is a bottom plan view of the knife; and

Fig. 7 is a fragmentary section of the knife showing the hardened plate at the bottom meeting the upper part of the knife;

Fig. 7A is a front view of another form of knife, of which Fig. 8 is a side view, Fig. 9 a rear view, Fig. 10 a bottom plan view of the upper part of the knife, Fig. 11 a bottom plan of the lower part of the knife, and Fig. 12 a top plan view of the lower part of the knife, which lower part is detachably connected to the upper part.

Referring to the drawings for a more detailed description thereof, the numeral 9 indicates the throw plate, 10 the shearing plate, and 11 the knife. The throw plate 9 has an outer feed slot 14 and an inner feed slot 15, both provided with feeders, and is cut away to receive the shearing plate 10, the upper surfaces of these two plates being coplanar, with an end of the shearing plate adjacent the inner feeder. The shearing plate is cut away between its sides to receive, in cutting relation, the vertically reciprocable V-shaped pinking knife 11, which knife is shown in all the figures of the drawings. The sides of the shearing plate are rabbeted so that it is level with the throw plate when resting on the two opposed ledges 17 of the throw plate, said ledges being clearly shown in the bottom plan view, Fig. 2.

The shearing plate includes a pair of shoulders or upright parts 19, rising from the side portions of the plate and adjacent the open end of the V; these shoulders limit the downward movement of the knife 11, and aid in guiding it. As heretofore made, they have been too high, limiting the length of the knife which could be used as it became shorter due to sharpening. I make these shoulders shorter so that a greater length of the knife may be used as it wears due to sharpening.

As shown in Figs. 1, 3 and 4, my improved shearing plate includes a plate 10A, set in the upper surface of the main portion of the shearing plate, so as to be level therewith and with the throw plate. The plate 10A extends forwardly from the mentioned uprights or shoulders 19 to that end of the shearing plate adjacent the inner feeder slot 15, and is very firmly secured to the main part of the shearing plate by several screws 21, the heads of the latter being on the under side of the main part of the shearing plate, as shown in the bottom plan view, Fig. 2. The plate 10A has a V cut, and the edges of the plate bounding this cut constitute the cutting edges which cooperate with the knife 11 in doing the pinking. When the thickness of the replaceable blade 10A has been so reduced by sharpening as to make its upper surface fall below the level of the throw plate 9, it is discarded and replaced by a new plate. Thus the main portion of the shearing plate may be saved, instead of being thrown away, as heretofore necessary. If desired, the plate 10A may be made of a very hard material, such as tungsten or titanium carbide, for example, or a steel containing the same, to give it a long life, but I have found that it is more important to improved the knife 11 by making it in two parts, the upper part 11A being of the usual steel, and the lower part 11B being of a very hard material, as for example, a hard metallic carbide, as tungsten or titanium carbide, or a steel containing the same, the two parts being secured together, as by welding for example, or by screws if desired. The lower end does the cutting and has the advantage, with the improved shearing plate, of avoiding the expensive defects of prior pinking attachments, as previously stated, and further automatically keeps sharp the cutting edge of the shearing plate as it reciprocates.

I have also improved the shearing plate by attaching a short curved cloth guide 25 thereto and providing an improved type of guide. This guide is detachably mounted on top of one of the uprights 19, as shown in Figs. 1 and 4. The guide is adjacent that end of the throw plate which the cloth enters, and is removably secured to the mentioned upright by a screw 26; in this position the guide functions to improve the quality of work. As shown in Figs. 1 and 4, the guide is in front of, and adjoins, the upright, and extends from the top of the upright down to the shearing plate, so no goods can get under it, and also extends in a curve laterally and backwardly beyond the side of the latter plate instead of being straight as in present guides, and it has a horizontal ledge or projection 27 (Fig. 1) at that part of its upper portion which is in front of the upright, the ledge curving out from the main body of the guide. This curve of the ledge prevents the cloth from being caught in the guide, which happens when the projection is not curved but forms a right angle with the main part of the guide. Further, the cloth cannot get under the guide, as happens with other types of guides. It will be understood that without the ledge or projection, the cloth curls up and the pinking occurs too far into the goods. The guide is adjustable relative to the apex of the pinking edge of the knife 11, to regulate the depth of pinking.

In Figs. 7A and 8 through 12, I show a modified form of knife, comprising an upper part 35 and a lower part 36, which is detachably connected to the upper part, so that it can be replaced when worn. The bottom surface of the upper part has a groove 38 (Fig. 10) extending from the vertex to the rear edge and which receives a tongue 39 (Fig. 12) formed on the top surface of the lower part 36 of the knife. The upper and lower parts are detachably connected by a screw 40 (Fig. 11), the head of the screw sunk. The upper part of the knife, in this form, may be of ordinary steel, but the lower part is of a hard steel, but not so hard as a steel containing a hard metal carbide, which is hard enough to give a reasonably lay life when used to pink lightweight materials. Otherwise the knife is the same as that previously described.

What is claimed is:

The combination of a pinking attachment for a sewing machine comprising a throw plate having ends and an upper surface, said plate having a feed slot, pinking mechanism adjacent the throw plate and comprising a shearing plate between the ends of the throw plate and having ends and an upper surface with one end adjacent the feed slot of the throw plate, the upper surface of the shearing plate being coplanar with the upper surface of the throw plate, the shearing plate comprising spaced parallel side arms and having a V-shaped opening near the feed slot of the throw plate and continuous with the space between the spaced arms of the shearing plate, knife limiting uprights rising from said arms, the shearing plate recessed below its upper surface at the end adjacent the feeder slot, and forwardly of said uprights, a plate detachably set in said recess and having a V-shaped cutting edge registering with V-shaped opening of the main part of the shearing plate, and a V-shaped reciprocable knife fitting into the mentioned V-shaped recesses and adapted to cooperate therewith for pinking operation, said knife comprising an upper and a lower end part, the lower end part being detachably secured to the upper part, and a short guide extending laterally beyond the shearing plate and curved backwardly and secured to the top of one of said uprights and disposed adjacent the front thereof, and adjustable towards and away from said feed slot and comprising a main body and a horizontal ledge which curves downwardly into the main body.

References Cited in the file of this patent

UNITED STATES PATENTS

| Re. 19,667 | Popper | Aug. 13, 1935 |
| 1,962,024 | Mann | June 5, 1934 |
| 2,093,071 | Brussell | Sept. 14, 1937 |
| 2,190,651 | Chester et al. | Feb. 20, 1940 |
| 2,194,148 | Moulton | Mar. 19, 1940 |
| 2,242,097 | Weidauer | May 13, 1941 |